United States Patent [19]

Kishi et al.

[11] Patent Number: 4,699,850

[45] Date of Patent: Oct. 13, 1987

[54] ORNAMENTAL PART

[75] Inventors: Matsuo Kishi; Kenichi Ogawa; Hiroshige Ikeno, all of Tokyo, Japan

[73] Assignee: Seiko Instruments & Electronics Ltd., Tokyo, Japan

[21] Appl. No.: 837,510

[22] Filed: Mar. 7, 1986

[30] Foreign Application Priority Data

Mar. 19, 1985 [JP] Japan ............................ 60-39676[U]

[51] Int. Cl.[4] ............................................... B32B 15/04

[52] U.S. Cl. .................................... 428/469; 428/698; 428/699; 428/627; 428/657

[58] Field of Search ............... 428/698, 699, 469, 627, 428/657

[56] References Cited

U.S. PATENT DOCUMENTS

| | | | |
|---|---|---|---|
| 3,242,664 | 3/1966 | Lederrey | 428/579 X |
| 4,101,703 | 7/1978 | Schintlmeister | 428/698 X |
| 4,252,862 | 2/1981 | Nishida | 428/457 |
| 4,591,418 | 5/1986 | Snyder | 428/698 X |
| 4,640,869 | 2/1987 | Toth | 428/699 X |

FOREIGN PATENT DOCUMENTS

| | | | |
|---|---|---|---|
| 2528255 | 2/1976 | Fed. Rep. of Germany | 428/698 |
| 149528 | 3/1984 | Japan | 428/698 |

*Primary Examiner*—Nancy A. Swisher

[57] ABSTRACT

The present device relates to an ornamental part utilized in watchcases, watchbands, spectacle frames, accessories and such, wherein the material of the member is heat-resisting material such as metal, ceramics, or plastic, the material being covered by a three-layer structure coating, the successively formed layers being; a layer which has gold colored titanium nitride as its main component; a layer which has gold colored zirconium nitride as its main component; and a gold or gold alloy layer formed on the outer layer.

31 Claims, 2 Drawing Figures

ORNAMENTAL PART

BACKGROUND OF THE INVENTION

1. Field of the Invention

The present invention relates to an ornamental part utilized in watchcases, watchbands, spectacle frames, accessories and the like.

2. Description of the Prior Art

Conventionally, gold or gold alloy material or gold-plated material has been utilized as gold colored ornamental parts. Recently, studies on physical vapor deposition processes have advanced, and super-hard compound coatings with very high wear-resistance, compounds such as gold colored titanium nitride, zirconium nitride, and tantalum nitride, have been developed, and are beginning to be widely used as ornamental parts. Also, as a gold external portion combining the characteristics of titanium nitride coatings and of gold plating, a gold colored ornamental part constructed of titanium nitride coating as the foundation layer and of gold or gold alloy coating on the upper part are being made. For example, ornamental parts of this type are disclosed under Japanese Provisional Publication No. 139037/1975 and Japanese Patent Publication No. 26664/1984.

Utilizing pure gold material or gold plating in the conventional way is expensive from the standpoint of material cost, and has some drawbacks such as in wear-resistance and corrosion-resistance, and also requires a certain thickness of the plating (more than 10 $\mu$m). Also, when utilizing titanium nitride coating, there are drawbacks in that the color is darker than gold, and that its quality is inferior. Although coatings other than titanium nitride, such as zirconium nitride and tantalum nitride, do have a gold color with better quality compared to titanium nitride, the color is still inferior to the color of gold. Furthermore, in forming these coatings, the deposition rate compared to that of the titanium nitride is very slow, there being a necessity for a long process time to obtain a coating with similar efficiency, and so as a result, the yield becomes low, the cost becomes high, and thus such coating are difficult to realize commercially. With a titanium nitride coating on which gold or gold alloy film is formed, when the gold or gold alloy layer becomes worn, the titanium nitride layer at the lower layer appears, and presents an unpleasant appearance because of its dark color which is noticeably different from the gold color.

BRIEF SUMMARY OF THE INVENTION

An object of the present invention is to solve the afore-mentioned drawbacks and problems and to provide a low cost ornamental part having a gold color and which exhibits the least color difference when wearing occurs.

The ornamental part according to the present device is invention is preferably formed as follows;

form a gold colored coating of titanium nitride or titanium nitride compounds, such as titanium carbonitride, by chemical vapor deposition (CVD) process, such as thermochemical reaction or plasma CVD, or by physical vapor deposition (PVD) process such as ion-plating, or sputtering, on the ornamental part which comprises a thermal resistant substrate made of heat-resisting material such as metal;

onto the above coating, form a coating of zirconium nitride or zirconium nitride compounds, such as zirconium carbonitride, by a similar method as above, having a color very close to gold or gold alloy color;

form a coating of gold or gold alloy by physical vapor deposition process, such as vacuum evaporation, ion-plating, sputtering and such, or by wet process such as electroplating, electroless plating and such.

DETAILED DESCRIPTION OF INVENTION

An ornamental part on which gold colored coating is formed as above, has a gold color very close to the color of gold or gold alloy coating of the top layer, even when parts of the gold or gold alloy coating become worn. This is because of the gold colored coating having zirconium nitride as its main component at the intermediate layer, and thus, the color does not present an unpleasant impression to the human eye.

Figure 2:
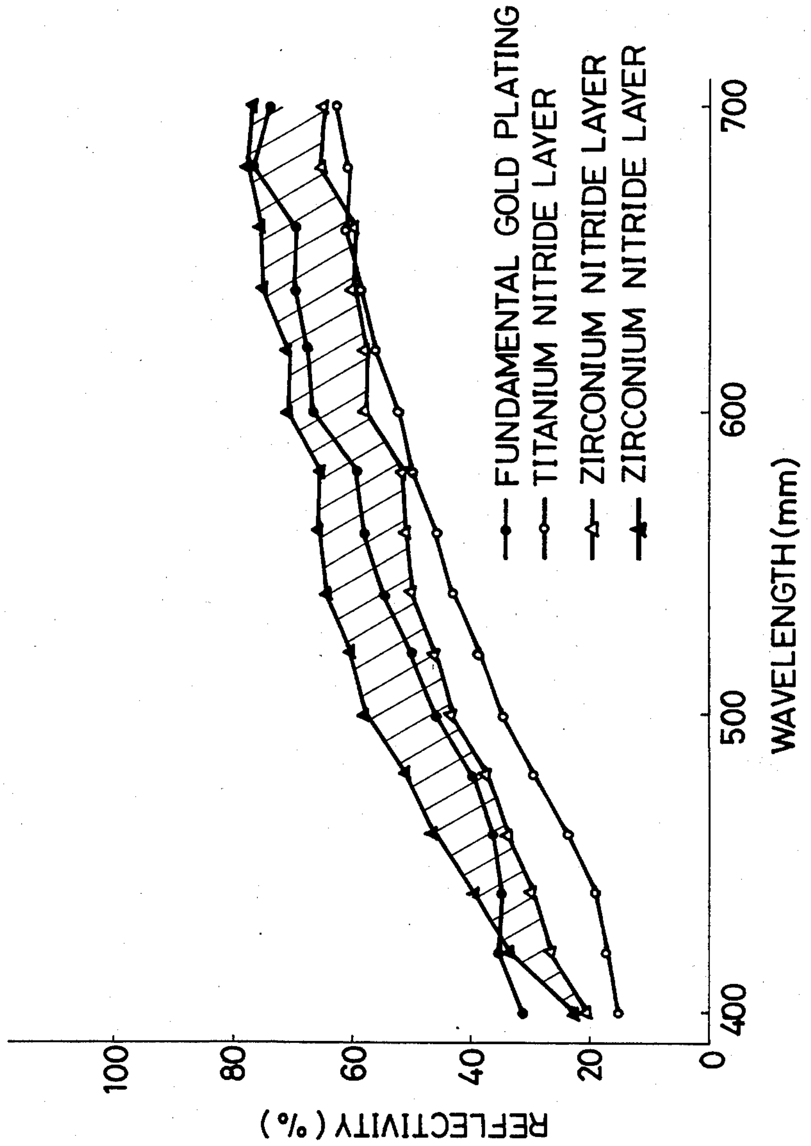
FIG. 2 shows reflectance curves of gold plating, which is conventionally utilized for ornamental parts, ion plated titanium nitride and zirconium nitride usually utilized as fundamental gold plating color of Hamilton Gold.

FIG. 2 shows reflectance curves of fundamental gold alloy plating; which is conventionally utilized for ornamental parts, ion plated titanium nitride, and zirconium nitride.

As shown in FIG. 2, changing the proportions of zirconium and nitrogen causes changes in the reflectance of the zirconium nitride coating in within the oblique line area, and the color of the zirconium nitride coating as it more closely simulates that of the fundamental gold plating is clearly superior to that of the titanium nitride coating.

In zirconium carbonitride coatings, it is possible to change the reflectance characteristics over a relatively wide range.

This series of zirconium nitride coatings is a super hard coating series with high wear-resistance, but its deposition rate is slow. So, by first forming a titanium nitride coating which has a fast deposition rate at the lowest layer, the thickness of the whole coating is thickened, and such improvements as corrosion-resistance, and wear-resistance can be obtained.

Figure 1:
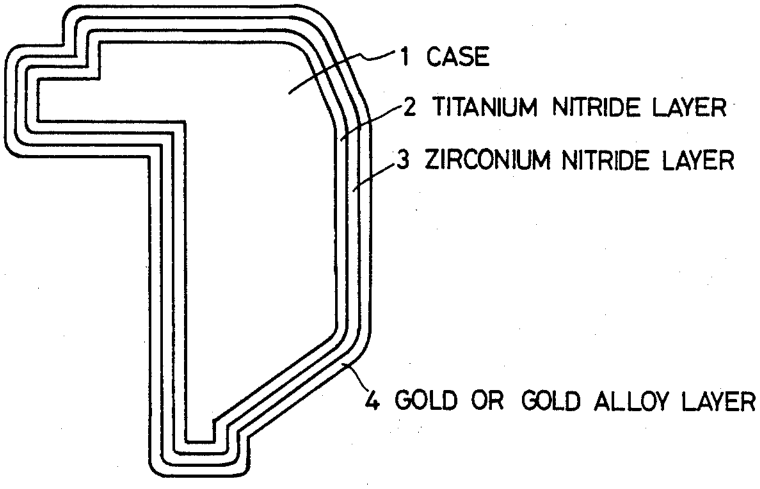
FIG. 1 is a sectional explanatory view of an ornamental part in the form of a watchcase according to the present invention.

FIG. 1 is a sectional explanatory drawing of a watchcase, as a typical example of an ornamental part relating to the present invention. Numeral 1 is a watchcase constructed of metal or heat-resisting material and defining a thermal resistant substrate. Numeral 2 is a layer having gold colored titanium nitride as its main component. Numeral 3 is a layer having gold colored zirconium nitride as its main component. Numeral 4 is gold or gold alloy layer.

An explanation relating to the method of making the watchcase shown in FIG. 1 is described below in the following examples.

EXAMPLE 1

Wash a stainless steel watchcase with organic solvent, acid, and alkali, set the watchcase onto a jig provided inside an apparatus for effecting activated reactive evaporation (ARE), conduct vacuum evacuation until reaching a pressure of $5\times10^{-5}$ Torr, heat-evaporate the titanium with an electron beam in an atmosphere of nitrogen at a partial pressure of $1\times10^{-3}$ Torr, form a discharge with an ion-plating mechanism and form approximately 1 $\mu$m of gold colored titanium nitride on the watchcase, at a deposition speed of about 0.05 $\mu$m/minute.

Next, evaporate zirconium with electron beam evaporation equipment provided separately within the same apparatus, conduct ion-plating in the atmosphere of nitrogen at a partial pressure $5\times10^{-4}$ Torr, and form approximately 0.1 $\mu$m of gold colored zirconium nitride at a deposition rate of about 0.01 $\mu$m/minute. Next, evaporate the gold in which a weight ratio 3% of nickel is contained, with another electron beam evaporation equipment, and form approximately 0.05 $\mu$m of gold-nickel alloy coating. Then, the gold color of the watchcase becomes what is generally called Hamilton gold color.

When an oxhide sliding abrasion test is conducted on the sample, for 50,000 times with a 500 g load, although a part of the gold-nickel alloy at the top layer is worn, the zirconium nitride at the intermediate layer does not wear at all, and no color change appears, thus creating no unpleasant impression to the human eye. Also, the sample does not change at all with 48 hours of 5% salt spray test, and it is confirmed that its corrosion-resistance is very efficient.

EXAMPLE 2

Wash a stainless steel watchcase in the same manner as in example 1, set the watchcase inside an ion-plating device, conduct vacuum evacuation until reaching a pressure of $5\times10^{-5}$ Torr, evaporate the titanium with an electron beam in the atmosphere of $1.5\times10^{-3}$ Torr nitrogen partial pressure and $2\times10^{-4}$ Torr acetylene partial pressure, form a discharge with an ion-plating mechanism, conduct ion-plating, and form approximately 1 $\mu$m of gold colored titanium carbonitride on the watchcase with a deposition rate of about 0.05 $\mu$m/minute. Next, evaporate zirconium with another electron beam evaporation equipment, conduct ion-plating in an atmosphere of $5\times10^{-4}$ Torr nitrogen partial pressure and $1\times10^{-4}$ Torr acetylene partial pressure, and form approximately 0.05 $\mu$m of gold colored zirconium carbonitride with a deposition rate of about 0.01 $\mu$m/minute. Furthermore, evaporate cobalt with another electron beam evaporation equipment, and form approximately 0.01 $\mu$m of coating on the zirconium carbonitride coating. After this, remove the sample from the ion-plating device, form about 0.05 $\mu$m of pure gold plating with a wet process, and conduct heat treatment for 30 minutes at 500° within a non-oxidation atmosphere. Then the cobalt and the gold undergo mutual diffusion, become uniform gold-cobalt, and the gold color of the watchcase becomes Hamilton gold color as in example 1. When an oxhide sliding abrasion test is conducted on this sample for 50,000 times with a 500 g load, although a part of gold-cobalt alloy layer at the top layer is worn, the zirconium carbonitride at the intermediate layer does not wear at all, with no color change. Also, the cobalt layer formed in between the zirconium carbonitride and the pure gold plating forms gold alloy completely, without showing any color of cobalt. Its corrosion-resistance is efficient, with no change after 48 hours of 5% salt spray test.

EXAMPLE 3

Onto a brass watchcase, form 2 $\mu$m of nickel plating and 1 $\mu$m of nickel-paladium alloy plating both by means of a wet process, set the watchcase on a jig provided inside an ion-plating apparatus, conduct vacuum evacuation until reaching a pressure of $5\times10^{-5}$ Torr, heat-evaporate the titanium with an electron beam at an atmosphere of $2\times10^{-3}$ nitrogen partial pressure and $1\times10^{-4}$ Torr acetylene partial pressure, form discharge with an ion-plating mechanism, and form approximately 0.5 $\mu$m of gold colored titanium carbon nitride coating on the plated watchcase at the deposition rate of about 0.1 $\mu$m/minute. Next, evaporate zirconium with an electron beam evaporation equipment separately provided inside the same apparatus, conduct ion-plating at an atmosphere of $7\times10^{-4}$ Torr acetylen, and form approximately 0.05 $\mu$m of gold colored zirconium carbonitride at a deposition rate of about 0:02 $\mu$m/minute. Furthermore, by passing electric current to a tungsten boat, evaporate the gold alloy on the boat the alloy of which includes a weight ratio of 1% nickel and 2% cobalt, and form 0.1 $\mu$m of gold alloy coating on the watchcase. Then when removed from the apparatus, the watchcase presents a beautiful gold color.

When an oxhide sliding abrasion test is conducted for 50,000 times with a 500 g load onto this sample, no color change occurs. Also, by conducting 5% salt spray test for 48 hours to test its corrosion-resistance, almost no abrasion is seen, and an efficient result is obtained.

By successively forming three layer coatings, a coating with gold colored titanium nitride as its main component, a coating with gold colored zirconium nitride as its main component, and a gold or gold alloy cover film on an ornamental part, even when a part of the gold or gold alloy coating becomes worn during use of the ornamental part, the observable color change is limited to its minimum, because the intermediate layer with gold colored zirconium nitride as its main component has a high wear-resistance. Furthermore, as the zirconium nitride series coatings have drawbacks such as their deposition rate being slow, taking a long time to thicken the film, there are disadvantages in the yield and cost. But by forming at the lowest or innermost layer the coating with gold colored titanium nitride as its main component which has a relatively fast deposition rate, its favorable characteristics such as wear-resistance and corrosion-resistance can be best utilized, and thus the thickness of the film of the zirconium nitride series coating at the intermediate layer can be made thin, thereby reducing the negative aspects of forming the zirconium nitride series coating.

Conventionally, more than 10 $\mu$m of film thickness was necessary with gold plating, but with the present invention, only a several tenths or a several hundredths of the amount of gold is necessary, and it is possible to offer a very inexpensive gold colored ornamental part.

A stainless steel watchcase and a nickel and nickel-paladium alloy plated brass watchcase have been shown in the afore-described examples of the present invention, but articles other than watchcases, articles needing gold colored decoration such as watchbands, spectacle frames, lighters, fountain pens, etc. can also be coated in the same manner. Furthermore, as the process method, the combination of ion-plating, vacuum evaporation, wet process, and heat treatment has been shown in the foregoing examples, but it is clear that other combinations of methods, such as sputtering, heat chemical reaction, chemical vapor deposition methods utilizing plasmas and the like, can be utilized in carrying out the present invention.

What I claim is:

1. An ornamental part comprising: a thermal resistant substrate; and a coating composed of three layers formed on the substrate, said three layers comprising an innermost layer of titanium nitride or titanium nitride compound, an intermediate layer adjacent to said innermost layer, the intermediate layer being of zirconium nitride or zirconium nitride compound, and an outermost layer adjacent to said intermediate layer, the outermost layer being of gold or gold alloy.

2. An ornamental part according to claim 1; wherein said titanium nitride compound comprises titanium carbonitride.

3. An ornamental part according to claim 1 or 2; wherein said zirconium nitride compound comprises zirconium carbonitride.

4. An ornamental part according to claim 3; wherein said gold alloy comprises gold-cobalt alloy.

5. An ornamental part according to claim 4; including a further layer interposed between the thermal resistant substrate and the innermost layer of titanium nitride or titanium nitride compound.

6. An ornamental part according to claim 3; including a further layer interposed between the thermal resistant substrate and the innermost layer of titanium nitride or titanium nitride compound.

7. An ornamental part according to claim 2; including a further layer interposed between the thermal resistant substrate and the innermost layer of titanium nitride or titanium nitride compound.

8. An ornamental part according to claim 1; including a further layer interposed between the thermal resistant substrate and the innermost layer of titanium nitride or titanium nitride compound.

9. An ornamental part according to claim 1; wherein at least one of said innermost and intermediate layers is formed by a physical vapour deposition process.

10. An ornamental part according to claim 9; wherein said physical vapour deposition process comprises ion plating, sputtering or vacuum evaporation.

11. An ornamental part according to claim 1; wherein said thermal resistant substrate is composed of a material selected from stainless stell, brass, ceramics and plastic.

12. An ornamental part according to claim 1; wherein said thermal resistant substrate is composed of brass plated with nickel and nickel-palladium alloy.

13. An ornamental part according to claim 1; wherein said gold alloy comprises gold-nickel alloy or gold-nickel-cobalt alloy.

14. An ornamental part according to claim 1; wherein said gold alloy comprises gold-cobalt alloy.

15. An ornamental part according to claim 1; wherein at least one of said innermost and intermediate layers is formed by a chemical vapour deposition process.

16. An ornamental part according to claim 15; wherein said chemical vapour deposition process comprises a thermo-chemical reaction process or a plasma chemical vapour deposition process.

17. An ornamental part comprising: a thermal resistant substrate; and a coating composed of three layers formed on the substrate, said three layers comprising an innermost layer of titanium nitride or titanium carbonitride, an intermediate layer of zirconium nitride or zirconium carbonitride, and an outermost layer of gold-nickel alloy or gold-cobalt alloy, said intermediate layer of zirconium nitride or zirconium carbonitride layer not containing any free zirconium.

18. An ornamental part according to claim 17; including at least one additional layer interposed between the innermost layer and the thermal resistant substrate.

19. An ornamental part according to claim 17; wherein the intermediate layer comprises zirconium carbonitride and the outermost layer comprises gold-cobalt alloy.

20. An ornamental part according to claim 19; wherein the thickness of the innermost layer is approximately ten times that of the intermediate layer.

21. An ornamental part comprising: a substrate; and a coating formed on the substrate, the coating having an inner layer of titanium nitride or titanium nitride compound, an intermediate layer formed on the inner layer and having a thickness less than that of the inner layer, and an outer layer of gold or gold alloy formed on the intermediate layer, the intermediate layer being formed of a material not containing titanium nitride and the intermediate layer having a color tone closer to that of the outer layer than that of the inner layer.

22. An ornamental part according to claim 21; wherein the intermediate layer is formed of zirconium nitride or zirconium nitride compound.

23. An ornamental part according to claim 22; wherein the outer layer comprises gold-cobalt alloy.

24. An ornamental part according to claim 22; wherein the inner layer has a thickness at least approximately ten times thicker than that of the intermediate layer.

25. An ornamental part according to claim 22; including at least one additional layer formed between the substrate and the inner layer.

26. An ornamental part according to claim 25; wherein the at least one additional layer is formed of nickel or nickel alloy.

27. An ornamental part according to claim 26; wherein the substrate comprises brass.

28. An ornamental part according to claim 22; wherein the intermediate layer comprises zirconium carbonitride.

29. An ornamental part according to claim 21; wherein the outer layer comprises gold-nickel alloy.

30. An ornamental part according to claim 21; wherein the outer layer comprises gold-cobalt-nickel alloy.

31. An ornamental part according to claim 21; wherein the inner layer has a thickness at least approximately ten times thicker than that of the intermediate layer.

* * * * *